United States Patent [19]
Lin et al.

[11] Patent Number: 6,060,842
[45] Date of Patent: *May 9, 2000

[54] ELECTRONIC BALLAST LIGHTING POWER CONTROL DEVICE

[76] Inventors: Ming-Chao Lin; Liu Chih Wang, both of 12F-1, No. 311, Sec. 4 Chung Hsiao E. Rd., Taipei, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/756,549

[22] Filed: Nov. 26, 1996

[51] Int. Cl.⁷ ........................................................ G05F 1/00
[52] U.S. Cl. ........................ 315/291; 315/307; 315/360; 315/127; 315/209 R
[58] Field of Search ...................... 323/299, 300, 323/905; 315/194, 223, 291, DIG. 4, DIG. 7, 209 R, 307, 308, 360, 127, 224

[56] References Cited

U.S. PATENT DOCUMENTS

| | | | |
|---|---|---|---|
| 5,177,409 | 1/1993 | Nilssen | 315/293 |
| 5,471,119 | 11/1995 | Ranganath et al. | 315/307 |
| 5,519,289 | 5/1996 | Katyl et al. | 315/224 |
| 5,539,284 | 7/1996 | Stone | 315/360 |
| 5,729,097 | 3/1998 | Holzer | 315/307 |
| 5,747,942 | 5/1998 | Ranganath | 315/224 |

*Primary Examiner*—Haissa Philogene
*Attorney, Agent, or Firm*—Rosenberg, Klein & Lee

[57] ABSTRACT

An electronic ballast lighting power control device including: a power switch controlled to provide a lighting power dim control signal to order the ballast providing an interrupted electric wave power output to the lighting fixture, and at least one electronic ballast respectively connected to the power switch and simultaneously controlled by the lighting power control signal of the power switch to provide an interrupted electric wave power output from the ballast to the lighting fixture, each of the at least one electronic ballast consisting of a filter, a rectifier, a power factor controller, a logic controller, an oscillator, and a protection circuit.

3 Claims, 6 Drawing Sheets

ELECTRONIC BALLAST LIGHTING POWER CONTROL DEVICE

FIELD OF THE INVENTION

The present invention relates to electronic ballast lighting power control devices, and relates more particularly to an electronic ballast lighting power control device which regulates lighting power by means of providing a certain interrupted high frequency electric wave power output from the ballast according to a desirable dim signal controlled directly by a power switch. The present invention relates also to the method of regulating the lighting power of an electronic ballast.

BACKGROUND OF THE INVENTION

The conventional power control device of a lighting fixture, as shown in FIG. 1, is generally comprised of a power switch 23, an electronic ballast 10 and an external lighting power dim control switch 27. The electronic ballast 10 is comprised of a filter 11, a rectifier 13, a power factor controller 15, a logic controller 17, an oscillator 19, and a protection circuit 18. The filter 11, the rectifier 13, the power factor controller 15, the logic controller 17 and the oscillator 19 are connected in series between the power switch 23 and the lighting fixture 20 to form a power supply circuit. The protection circuit 18 is connected between the output end of the oscillator 19 and an input end of the logic controller 17. In order to meet different lighting intensity requirements, a lighting power dim control switch 27 shall be used and connected to the electronic ballast 10 by an additional electric wire. The lighting power dim control switch 27 is controlled by the user to provide a lighting power control signal to the logic controller 17 of the electronic ballast 10, causing it to change the output voltage of the power factor controller 15 or the output frequency of the oscillator 19, so as to further change the impedance of an inductor or the like, and therefore the intensity of light of the lighting fixture 20 is regulated. However, because an additional circuit is required to connect the lighting power dim control switch 27 to the electronic ballast 10, the electric wiring of the lighting system is complicated. Furthermore, because this lighting power control method is achieved by controlling variable resistance, variable inductance, or output frequency, much energy is lost during the transmission of electric power.

SUMMARY OF THE INVENTION

The present invention has been accomplished to provide an electronic ballast lighting power control device which eliminates the aforesaid drawbacks. It is one object of the present invention to provide an electronic ballast lighting power control method, which regulates the lighting power of an electronic ballast by producing an interrupted high frequency electric wave output power from the electronic ballast, to change time ratio between power on stage and power off stage. It is another object of the present invention to provide an electronic ballast lighting power control device for controlling the lighting power out put of an electronic ballast by a dim signal outputted directly from the power switch without the use of an external lighting power dim control switch. It is still another aspect of the present invention to provide an electronic ballast lighting power control device which uses a single power switch to control the lighting power of a group of electronic ballasts without the use of a lighting power dim control switch. According to the present invention, the electronic ballast lighting power control device comprises a power switch controlled to provide a lighting power dim control signal, and at least one electronic ballast connected to the power switch and simultaneously controlled by the lighting power dim control signal of the power switch to order the electronic ballast providing a certain high frequency interrupted output electric wave to a lighting fixture, each of the at least one electronic ballast comprises a filter, a rectifier, a power factor controller, a logic controller, an oscillator, and a protection circuit.

DETAILED DESCRIPTION OF THE PREFERRED EMBODIMENT

Figure 1:
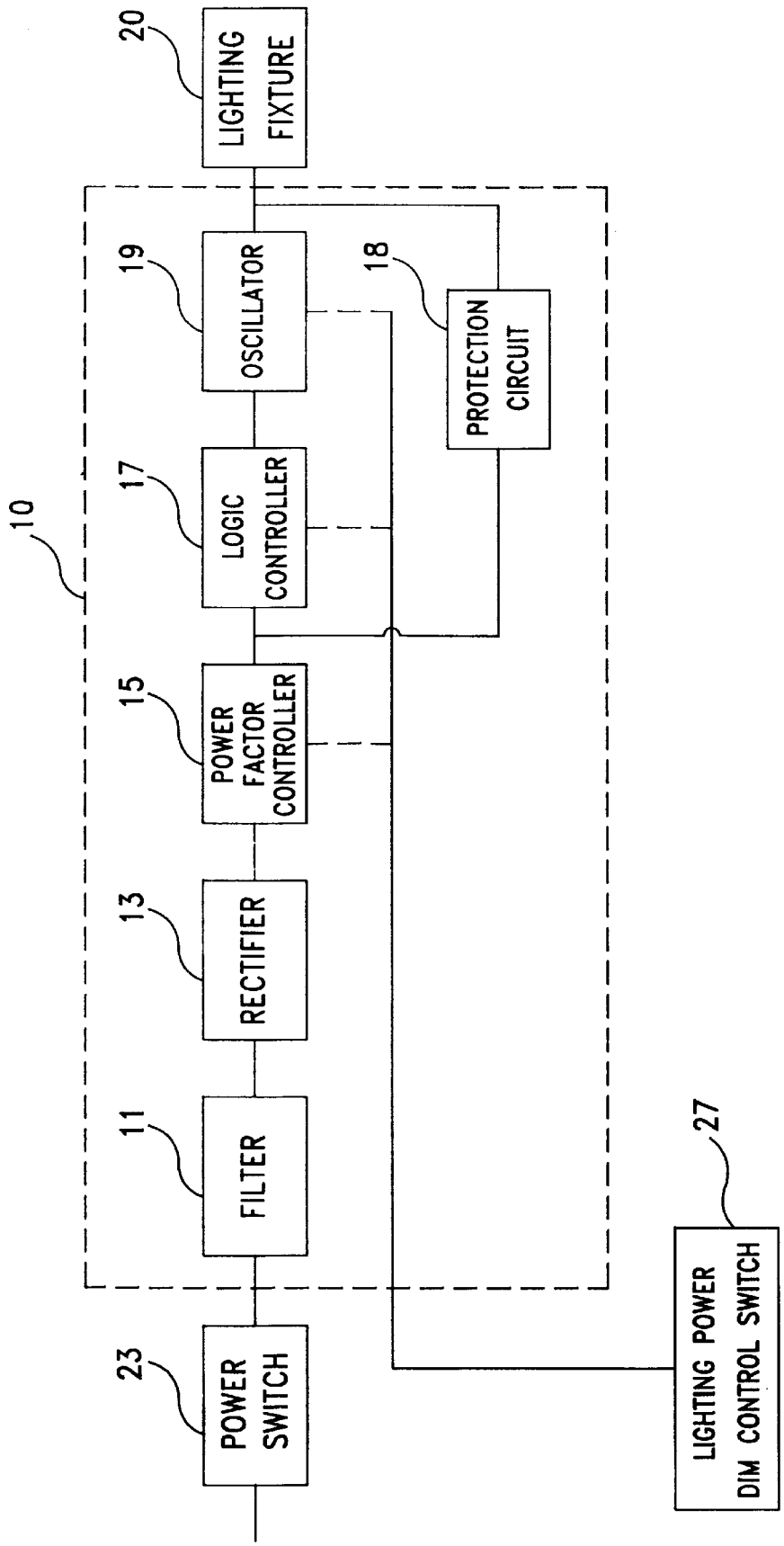
FIG. 1 is a circuit block diagram of an electronic ballast lighting power control device according to the prior art.
Figure 2:
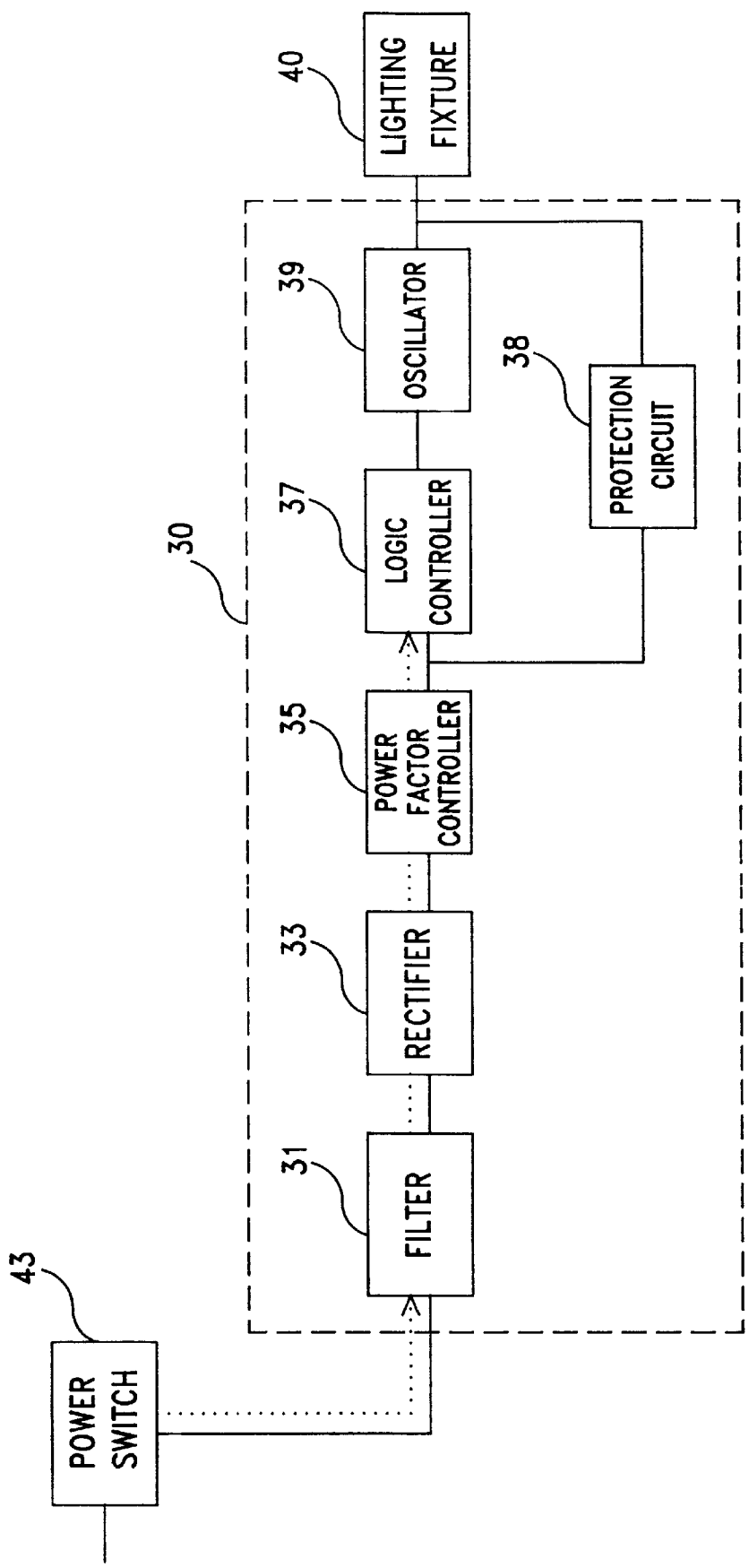
FIG. 2 is a circuit block diagram of an electronic ballast lighting power control device according to the present invention.

Referring to FIG. 2, an electronic ballast lighting power control device in accordance with the present invention is generally comprised of a power switch 43, and an electronic ballast 30. The power switch 43 can be a manual power switch 431 (as shown in FIG. 2B) or an electronic power switch, 435 which be a traic (as shown in FIG. 2C) and is controlled to provide a command signal, as a lighting power dim control signal by the frequency of punched the power switch 43 (showing as a dot line) to the electronic ballast 30 for producing a certain interrupted wave power output, causing the electronic ballast 30 to regulate the intensity of light of the lighting fixture 40 connected thereto. The electronic ballast 30 comprises a filter 31, a rectifier 33, a power factor controller 35, a logic controller 37, an oscillator 39, and a protection circuit 38. The input end of the filter 31 is connected to power supply through the power switch 43. The rectifier 33, the power factor controller 35, the logic controller 37 and the oscillator 39 are connected in proper order in series to the output end of the filter 31. The output end of the oscillator 39 is connected to the lighting fixture 40. The logic controller 37 receives instruction from the power switch 43, and provides interrupted high frequency output lighting power to the lighting fixture 40 to regulate its intensity of light (this will be described further).

Figure 2A:
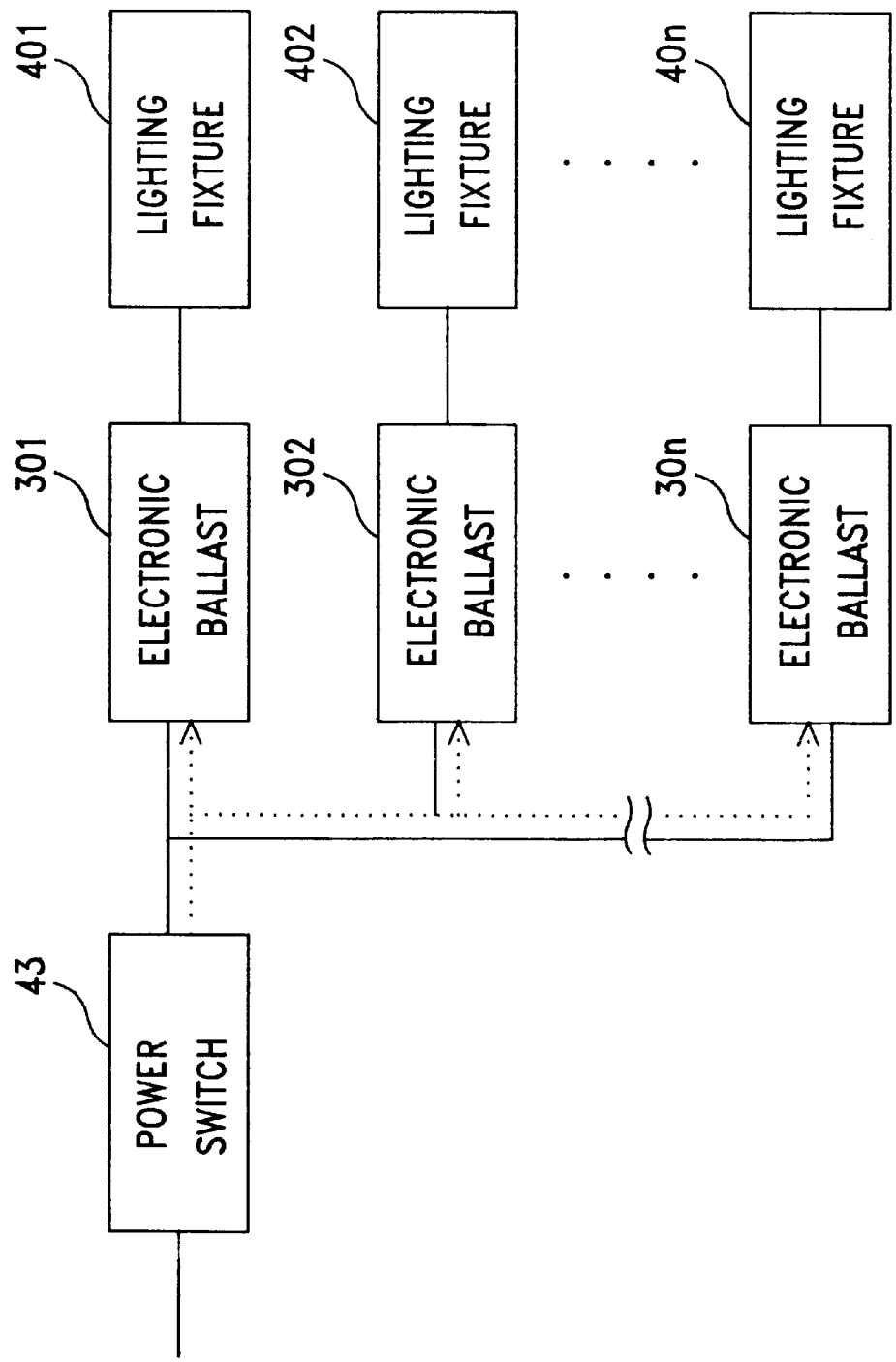
FIG. 2A shows an application example of the present invention.
Figure 2B:
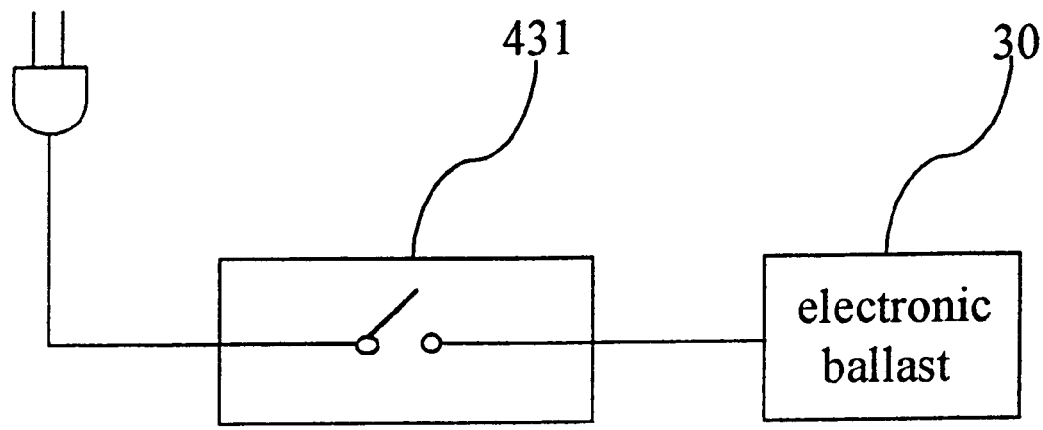
FIG. 2B is a manual power switch of the present invention.
Figure 2C:
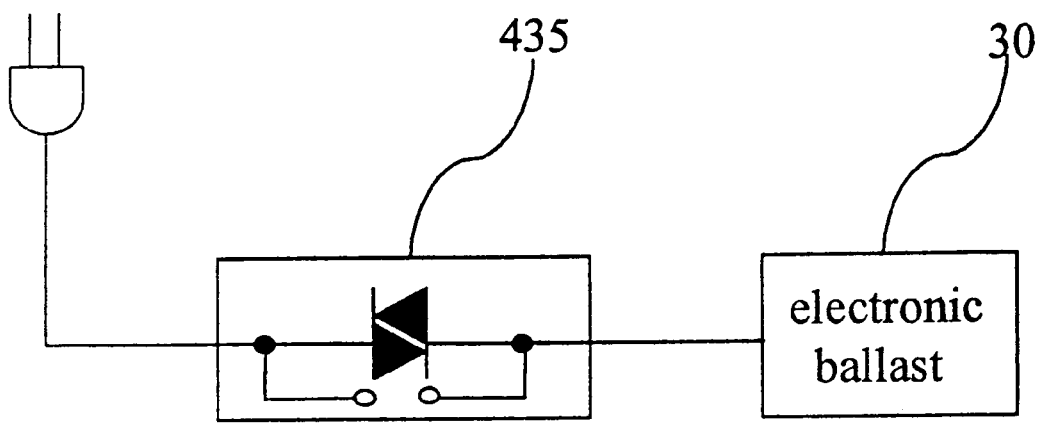
FIG. 2C is an electronic power switch of the present invention.

Referring to FIG. 2A, the power switch 43 may Simultaneously control several electronic ballasts 301, 302, . . . 30n, so that the light intensity of a number of lighting fixtures 401, 402, . . . 40n can be simultaneously regulated.

Figure 3A:
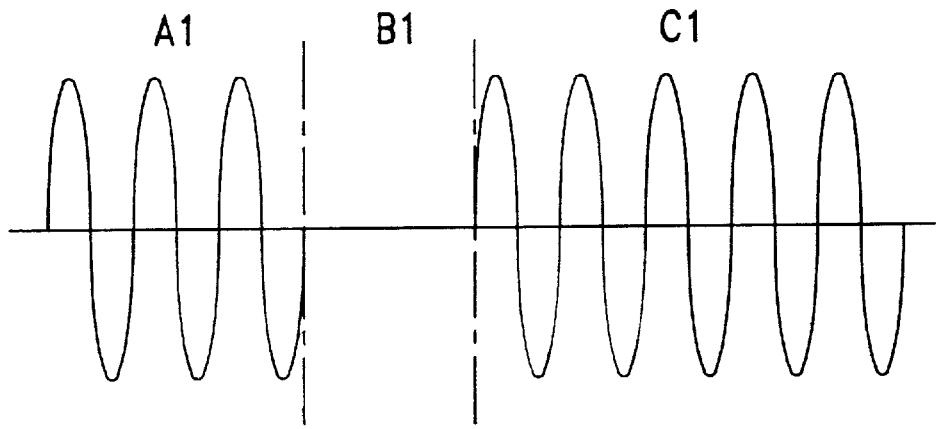
FIG. 3A is waveform of a lighting power dim control signal output from the power switch according to the present invention.
Figure 3B:
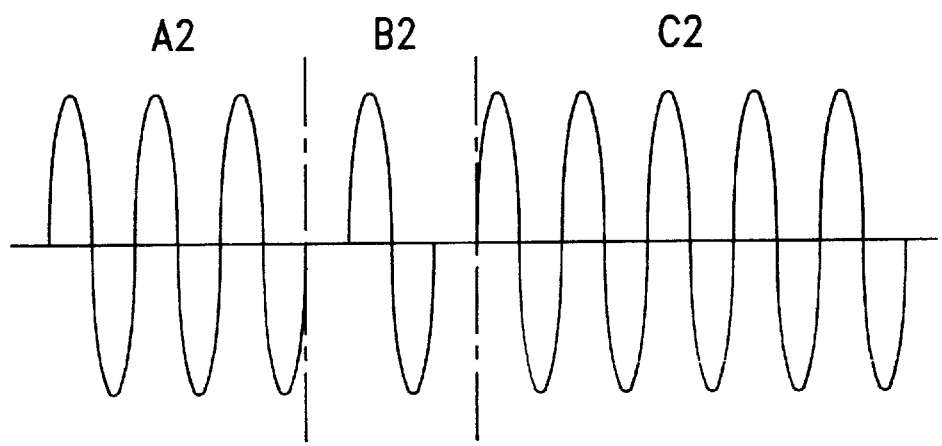
FIG. 3B is similar to FIG. 3A showing another waveform according to the present invention.
Figure 3C:
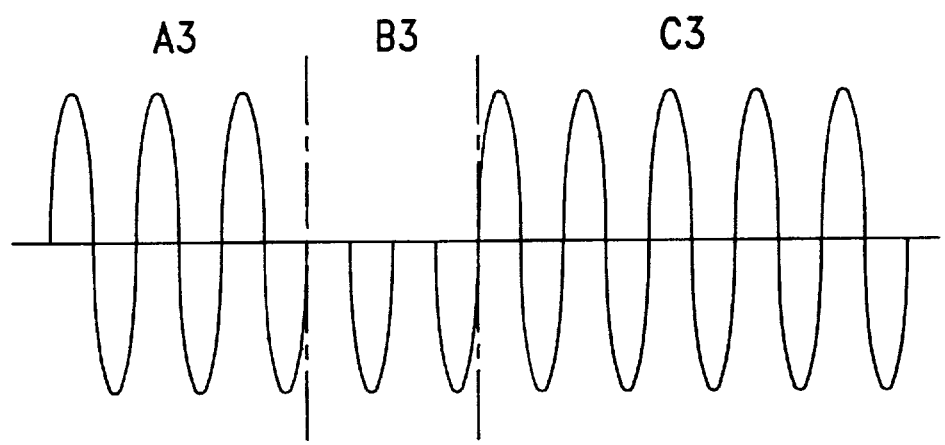
FIG. 3C is similar to FIGS. 3A and 3B showing another waveform according to the present invention.

Figures from 3A to 3C show three different dim control signals provided by the power switch wherein FIG. 3A be provided from the manual power switch and FIGS. 3B, 3C be provided from the electronic power switch. In order to simplify electrical wiring, no external dim control switch is used. When to regulate the intensity of light, a lighting power dim control signal is sent from the power switch to the electric ballast by the frequency of punched the power switch. Within normal power supply time intervals A1 (A2, A3), uninterrupted power is provided to the electronic ballast. When the power switch is to instruct the electric ballast to regulate the intensity of light, an instruction (lighting power dim control signal) is sent from the power switch. For example three different interruptions as shown in time intervals B1, B2 or B3 represents different level of dim control requests (three different lighting power dim control signals for instructing the electronic ballast to regulate the intensity of light of lighting fixture in three different styles), and thereafter another non-interrupted normal power supply section C1 (C2, C3) follows up until the power switch is to send another instruction (another lighting power dim control signal). Thus, the formation and transmission of a lighting power dim control signal are done. Because control signals are produced directly from the power switch, it is not necessary to install an additional control line or an additional selector switch.

Figure 4A:
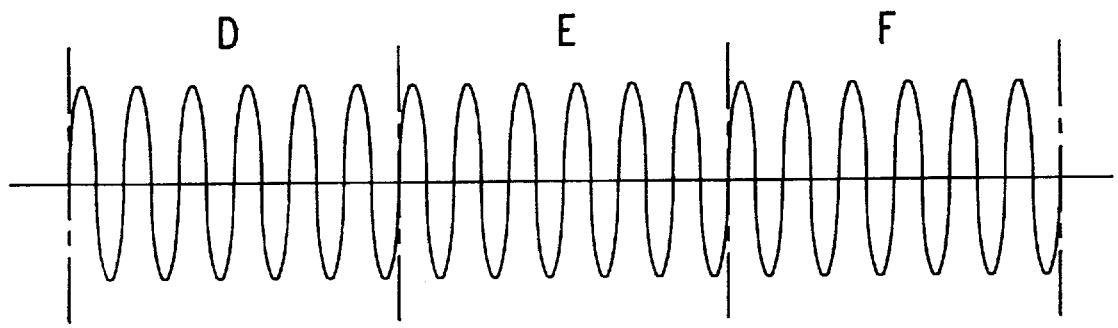
FIG. 4A is a non-interrupted electric wave showing a full power output of the electronic ballast according to the present invention.
Figure 4B:
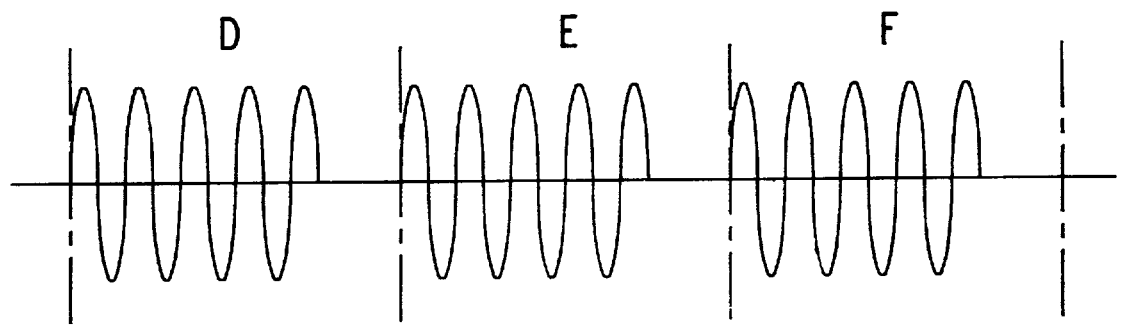
FIG. 4B is a partial interrupted electric wave showing another power output status of the electronic ballast according to the present invention; and, FIG. 4C is a half interrupted electric wave showing still another power output status of the electronic ballast according to the present invention.
Figure 4C:
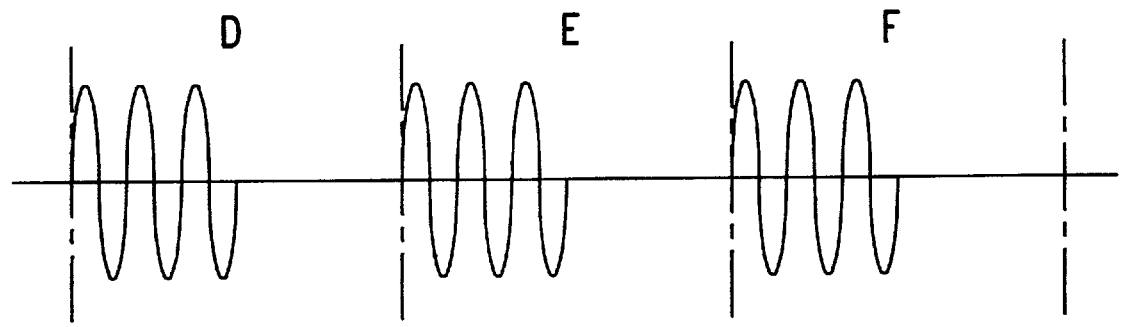

FIGS. 4A, 4B, and 4C show different lighting power output levels of the electronic ballast. After the logic controller of the electronic ballast receives a dim control signal from the power switch, it immediately provides a periodically interrupted high frequency lighting power output (interrupting a power supply applied thereto during an inactive time interval in each of successive time periods previously specified, for example) as shown in time periods D,E,F in the figure to the lighting fixture (the load), till another instruction is received. Within every time period such as D, E, F, shown in the figure, power off segment can be apparently distinguished from power on segment. For example, in FIG. 4A, power off segment is zero, i.e., 100% power output, and therefore the output of lighting power is at the maximum state; in FIG. 4B, there is 75% power output, therefore the power provided to lighting fixture is about 75% when compared to the maximum level i.e., the logic controller be disconnected the power output to the oscillator while 25% of each certain time period; in FIG. 4C, there is 50% power output, therefore the power provided to lighting fixture is about 50% when compared to the maximum level i.e., the logic controller be disconnected the power output to the oscillator while 50% of each certain time period.

Because the lighting fixture used is a discharge type lamp and the switching cycle is rapid, no flicker of light will be caused. Because the electronic ballast control device does not use any variable resistor, inductor or frequency regulator to achieve the regulation of the intensity of light, no extra impedance will be produced. Therefore, the present invention works efficiently, and saves the power consumption. Furthermore, the logic controller can be a microprocessor, or any of a variety of logic control devices having the performance to provide interrupted wave output.

While only one embodiment of the present invention has been shown and described, it will be understood that various modifications and changes could be made thereunto without departing from the spirit and scope of the invention disclosed.

What the invention claimed is:

1. An electronic ballast lighting power control device comprising:

a power switch coupled to a power source for selective coupling and interruption of power to an output thereof; and, at least one electronic ballast having an input coupled to said power switch and an output coupled to a lighting load, said electronic ballast including an oscillator having an output coupled to the lighting load, said electronic ballast including a logic controller having an input coupled to said output of said power switch and an output coupled to said oscillator for controlling dimming of the lighting load by altering a duty cycle of said oscillator responsive to successive operations of said power switch within a predetermined time period.

2. The electronic ballast lighting power control device as recited in claim 1 where said power switch is a manually operated switch.

3. A lighting control method, comprising the steps of:

a. providing an oscillator having an output coupled to a lighting load;

b. providing a switch to supply and interrupt power to the oscillator;

c. operating said switch to successively supply and interrupt power a number of times within a predetermined time period; and, d. monitoring said operation of said power switch and altering a duty cycle of said oscillator responsive to said number of successive operations of said power switch.

* * * * *